US006813308B1

(12) United States Patent
Ouvry et al.

(10) Patent No.: US 6,813,308 B1
(45) Date of Patent: Nov. 2, 2004

(54) CDMA RECEIVER WITH PARALLEL INTERFERENCE SUPPRESSION AND OPTIMIZED SYNCHRONIZATION

(75) Inventors: Laurent Ouvry, Grenoble (FR); Didier Varreau, St. Georges de Commiers (FR); Didier Lattard, Rencurel (FR); Sébastien Leveque, La Cote Saint André (FR)

(73) Assignee: Commissariat A l'Engerie Atomique, Paris (FR)

( * ) Notice: Subject to any disclaimer, the term of this patent is extended or adjusted under 35 U.S.C. 154(b) by 636 days.

(21) Appl. No.: 09/598,372

(22) Filed: Jun. 21, 2000

(30) Foreign Application Priority Data

Jul. 1, 1999 (FR) .............................. 99 08476

(51) Int. Cl.[7] .............................................. H04B 1/707
(52) U.S. Cl. ........................ 375/147; 375/346; 375/354
(58) Field of Search ................................. 375/130, 140, 375/142, 143, 147, 148, 150, 152, 285, 316, 346, 354; 370/203, 320, 335, 342, 441, 479, 503

(56) References Cited

U.S. PATENT DOCUMENTS

| 4,470,138 | A | * | 9/1984 | Gutleber ...................... 370/342 |
| 5,099,493 | A | * | 3/1992 | Zeger et al. ................. 370/342 |
| 5,467,368 | A | * | 11/1995 | Takeuchi et al. ............. 375/148 |
| 5,719,852 | A | | 2/1998 | Schilling et al. ............. 370/201 |
| 6,222,833 | B1 | * | 4/2001 | Seo ............................. 370/342 |
| 6,229,857 | B1 | * | 5/2001 | Wagner et al. ............... 375/316 |

FOREIGN PATENT DOCUMENTS

FR 2770060 4/1999

OTHER PUBLICATIONS

Buehrer, R.M. et al., "Analysis of DS–CDMA Parallel Interference Cancellation with Phase and Timing Errors", IEEE Journal on Selected Areas of Communications, vol. 14, No. 8, pp. 1522–1535, Oct. 1996.*

* cited by examiner

*Primary Examiner*—Chieh M. Fan
(74) *Attorney, Agent, or Firm*—Thelen Reid & Priest, LLP

(57) ABSTRACT

A receiver for transmission and parallel interference has multiple access interference suppression stages having K channels, each comprising a correlation device corresponding to a particular pseudorandom sequence and interference generation and suppression device. Each stage delivers to the following stage signals at least partly freed from multiple access interferences. A decision stage receives the signals from the channels of the preceding suppression stage. Each decision stage has a correlation device corresponding to one of the pseudorandom sequences and decision device to deliver data. Devices for producing synchronization signals can control the interference suppression and the decision device. The devices producing the synchronization signals have components placed in the channels of the final stage. Further ,the synchronization signals produced by these devices control the decision device of the channels of the final stage and the interference estimation device of the at least one interference suppression stages following appropriate time shifts.

3 Claims, 4 Drawing Sheets

CDMA RECEIVER WITH PARALLEL INTERFERENCE SUPPRESSION AND OPTIMIZED SYNCHRONIZATION

TECHNICAL FIELD

The present invention relates to a CDMA (code division multiple access) receiver with parallel interference suppression and optimized synchronization.

More generally, the invention relates to direct sequence spread spectrum (DSSS) digital transmission.

The invention has applications in radiocommunications systems with mobiles, in wireless local area networks (WLAN), in wireless local loops (WLL), in cable television and online multimedia services, in integrated home systems and electronic funds transfer, etc.

PRIOR ART

Direct sequence spread spectrum consists of modulating each symbol of a digital signal by a binary pseudorandom sequence. Such a sequence consists of N pulses or chips, whose duration Tc is equal to Ts/N. The modulated signal has a spectrum spread over a range N times wider than that of the original signal. On reception, demodulation consists of correlating the signal with the sequence used on transmission making it possible to once again find the information linked with the starting symbol.

This procedure has numerous advantages:
- discretion, because the spectral power density of the signal is reduced by a factor N;
- immunity against deliberate or parasitic, narrow band transmissions, because the correlation operation carried out at the receiver leads to the spectral spread of such transmissions;
- difficult interception, because demodulation requires the knowledge of the sequence used on transmission;
- resistance to multiple paths which, under certain conditions, give rise to selective frequency fading and consequently partly affect the transmitted signal;
- possible multiple access by the allocation of different sequences to different users.

The direct sequence spread spectrum modulation method has been extensively described in the specialist literature and reference can e.g. be made to the following:

"CDMA Principles of Spread Spectrum Communication", by Andrew J. VITERBI, Addison-Wesley Wireless Communication Series;

"Spread Spectrum Communications", by Marvin K. SIMON et al., vol. I, 1983, Computer Science Press;

"Spread Spectrum Systems", by R. C. DIXON, John WILEY and Sons.

The attached FIG. 1 illustrates the principle of a spread spectrum signal receiver. The receiver shown receives a signal r(t) and comprises a first circuit 10, referred to hereinafter as the correlation means, and which can be a matched filter or a sliding correlator, a circuit 12 for recovering a symbol clock signal, which makes it possible to synchronize the receiver means, optionally a processing circuit 14 able to perform various supplementary processing operations, such as a delayed multiplication, a channel estimation, etc. and finally a circuit 16 able to take a decision on the value of the transmitted symbol.

The first circuit of said receiver (correlation means 10), no matter whether it is a sliding correlator or a matched filter, plays an important part which can be defined with the aid of FIGS. 2 and 3.

A sliding correlator (FIG. 2) diagrammatically comprises a pseudo-random sequence generator 20 and a multiplier 22 receiving the input signal r(t) and the sequence delivered by the generator 20, an adder 24, a circuit 26 connected to the output of the adder 24 and relooped thereon and effecting a time lag. The sliding correlator output is connected to an undersampler 28. The circuits 20, 26, 28 are controlled by a symbol clock signal Hs.

The matched filter (FIG. 3) is generally a digital filter 30, whose coefficients are matched to the sequence used. This filter receives the input signal r(t) and delivers a filtered signal applied to an undersampler 28, which is controlled by the symbol clock signal Hs.

Viewed from the output of the undersampler 28, said two architectures are equivalent. However, viewed from the input of the undersampler 28, they are different, because they do not deliver the same signal, as is revealed by FIGS. 4, 5 and 6.

FIG. 4 shows the output Sf of the matched digital filter of FIG. 3, as a function of the rank n of the samples. FIG. 5 shows the output Sc of the sliding correlator when the local replica of the transmitted sequence is aligned with the transmitted sequence. FIG. 6 shows the output Sc of said sliding correlator when the local replica of the sequence is not aligned with the transmitted sequence. The correlation peak carrying the information on the symbol is marked P in FIGS. 4 and 5.

These drawings show that the sliding correlator needs an information linked with the timing of the symbols, so-called symbol clock signal and designated Hs to enable the local replica of the sequence to be aligned with the sequence modulating the symbols received, otherwise the demodulation of the symbols is impossible (case of FIG. 6). The matched filter does not require this information. Thus, what firstly differentiates a sliding correlator structure and a matched filter structure is that the former needs an external synchronization information.

A matched filter makes it possible to recover the symbol clock, e.g. by a recursive detection of the correlation peak on a window of N points (FIG. 4). It is also possible to recover the symbol clock with the aid of a sliding correlator, but this is more complex. There is a need for a stepwise modification of the phase of the local replica of the sequence until the output of the sliding correlator corresponds to an energy maximum and consequently to a correlation peak (case of FIG. 5).

Although both these structures make it possible to find the symbol clock again, they do not do so at the same speed. The symbol clock recovery operation lasts a maximum of N symbol periods, i.e. NTs with a sliding correlator, whereas it only requires a single symbol period Ts with a matched filter.

Thus, the advantage of the matched filter is obvious with respect to the symbol clock signal acquisition speed. Its disadvantage is its operational complexity, because its installation in the form of a finite pulse response digital filter (operating at the speed of the chips multiplied by the number of samples) requires N multiplications and N additions for each sample. Thus, its structural complexity is linked with its operating complexity.

The sliding correlator only performs one multiplication and one addition for each new sample. Thus, although it is relatively poorly adapted to the clock recovery, it is very advantageous from the operating complexity standpoint.

The CDMA method can be of two types. If the different transmitters of users do not have a common time reference the system is said to be asynchronous, because the starts of the symbols of each user arrive at the receiver at different times. It is also possible to proceed in such a way that the starts of the symbols received from the different users (modulo period Ts of a symbol). The system is then said to be synchronous. Asynchronous systems have the major advantage of not requiring an external synchronization signal, unlike in synchronous systems, but this is to the detriment of more serious constraints with respect to the spread sequence properties.

Thus, in an asynchronous CDMA system, the sequences have random relative phases at the reception level. Thus, a good separation of the signals assumes that the intercorrelations between sequences are small, no matter what the relative phases between the sequences.

If $g_i(t)$ and $g_k(t)$ are used for designating two pseudorandom sequences allocated to users i and k, it is possible to define a coefficient $\mu_{i,k}$ translating the correlation between these two sequences. This coefficient is equal to the mean, on the duration Ts of a symbol, of the product of the sequences, i.e.:

$$\mu_{i,k} = \frac{1}{Ts}\int_0^{Ts} g_i(t)g_k(t)dt.$$

This coefficient represents an autocorrelation if i=k and an inter-correlation if i≠k.

The signal at the output of the correlator corresponding to the user of rank k (i.e. following the undersampler 28 of FIG. 2) can be written, as a function of its coefficient:

$$A_k d_k + \sum_{\substack{i=0 \\ i \neq k}}^{K-1} \mu_{i,k} A_i d_i + \frac{1}{Ts}\int_0^{Ts} n(t) \cdot g_k(t) \cdot dt$$

where $A_k$ is the amplitude of the signal of the user of rank k, $g_k(t)$ the pseudorandom sequence of said same user, $d_i$ the transmitted data and n(t) an additive, Gaussian, white noise. In this expression, i ranges from 0 to K−1, K being the total number of users, but without assuming the value k of the user in question.

The first term, i.e. $A_k d_k$ makes it possible to again find the data item $d_k$, the second term corresponding to a correlation with the signals corresponding to other users. This term is called multiple access interference or MAI.

The existence of this multiple access interference leads to a non-negligible consequence with respect to the capacity of the transmission system, i.e. the number of acceptable simultaneous users and on the performance characteristics of the system.

Much research has been carried out with the aim of reducing this interference phenomenon and reference can be made to the following:

research on pseudorandom spread sequences,
research on the management of the power levels of different transmitters,
the use of adaptive antennas,
research on higher performance receiver structures.

The latter research has more particularly involved "sub-optimum" receiver structures which, unlike an optimum structure, effect a good compromise between performance characteristics and operating complexity. Among these, interest is attached to parallel interference suppression structures and details of these are given below.

A parallel interference suppression receiver generally uses:

a first stage based on a conventional detector with a bank of correlation means,
means for generating an interference signal,
means for suppressing in said signal interference produced by other system users,
a final stage of estimating the final data.

Such a procedure is described in the article by R. M. BUEHRER et al. entitled "Analysis of DS-CDMA Parallel Interference Cancellation with Phase and Timing Erros", published in IEEE Journal of Selected Areas in Communications, vol. 14, No. 8, Oct. 1996, pp 1522–1535. The corresponding receiver is illustrated in the attached FIG. 7 in the case of three users. The reception signal r(t) is processed in a first interference suppression stage $ESI_1$ constituted by three user correlation means 101, 102, 103. These correlation means deliver three decision signals $Z_1^1$, $Z_2^1$, $Z_3^1$, which are processed in three interference estimation circuits 111, 112, 113. The latter deliver signals $\hat{S}_1^1, \hat{S}_2^1, \hat{S}_3^1$, which are obtained by the spreading of signals Z by the pseudo-random sequences of three users. For each user, the signals $\hat{S}$ of the other users are summated, i.e. respectively $\Sigma_{2,3}$ for user 1, $\Sigma_{1,3}$ for user 2 and $\Sigma_{1,2}$ for user 3. These sums are subtracted from the reception signal r(t) in three subtractors 121, 122, 123 in order to obtain three new signals $r_1^1, r_2^1, r_3^1$.

In turn, the signals $r_1^1, r_2^1, r_3^1$ can be processed in a second interference suppression stage and so on up to the ith interference suppression stage $ESI_i$. Thus, freed from at least part of the multiple access noise, the signals $r_1^1, r_2^1, r_3^1$ permit a better estimate of the interference to be subtracted from the signal received r(t). In the stage of rank i, i.e. $ESI_i$, are only shown the subtractors with the signals $r_1^i, r_2^i$ and $r_3^i$.

The receiver comprises a final stage or decision stage ED, with three channels containing correlation means 141, 142, 143 and three decision circuits 151, 152, 153 delivering the data $d_1, d_2, d_3$.

In each stage there are synchronization means for the control of the different circuits. Thus, the first stage $ESI_1$ contains synchronizing circuits 131, 132, 133 controlling the correlation means 101, 102, 103 and estimation means 111, 112, 113. In the final stage ED there are synchronizing means 161, 162, 163 controlling the correlation means 141, 142, 143 and decision means 151, 152, 153.

In general terms, for constructing a multiple access interference correction signal, there is a need for three informations:

1) a symbol clock (Hs),
2) the amplitudes and
3) the signs of signals carried on the channels I and Q after correlation, i.e. A(I) and A(Q).

All these informations are calculated or recorded for each stage, for the control of said stage and independently of what takes place in the other stages.

Although this arrangement makes it possible to obtain a correct operation of the receiver it is still relatively complex. The invention obviates this disadvantage by proposing a simpler structure, which also makes it possible to turn to the best account the performance characteristics of the correlation means.

DESCRIPTION OF THE INVENTION

Use is made of a system with direct sequence spread spectrum and several optionally asynchronous transmitters.

At the parallel interference suppression receiver, the correlation peak or peaks corresponding to the different propagation paths of the signal of user k are placed precisely at the same locations in the symbol window, no matter what the considered suppression stage for a given symbol. Thus, the signal received contains the replicas of the signal transmitted by the user k associated with the propagation paths, at a fixed location for a given symbol in the symbol window. The time positions are estimated in the synchronization means and can doubtless be considered as different between individual stages, because during the suppression stages interference is progressively removed from the signal. However, the information received does not move relative to the window of the considered symbol. Thus, a single synchronization signal per path is sufficient and not one per path and per stage.

Thus, the applicant has decided to use the synchronization signal or signals calculated in the final receiver stage, said signals being less error-tainted, for controlling all the interference suppression stages for each user.

Thus, the invention renders unnecessary complex calculations for investigating clock signals at all the first stages and consequently considerably reduces the operational complexity of the receiver. This complexity can be further reduced by the use of sliding correlators in the first stages and matched filters in the final stage. As explained hereinbefore, the matched filter makes it possible to acquire the synchronization in a single symbol period, whilst the use of sliding correlators makes it possible to reduce the operational complexity without deteriorating said acquisition time.

More specifically, the present invention relates to a receiver for multiplex access transmission with distribution by codes and parallel multiple access interference suppression comprising:

at least one multiple access interference suppression stage constituted by K channels, each comprising a correlation means corresponding to a particular pseudorandom sequence and interference generation and suppression means, each stage delivering to the following stage K signals at least partly freed from multiple access interferences, a final, decision stage constituted by K channels receiving the K signals from the K channels of the preceding suppression stage and each comprising a correlation means corresponding to one of the pseudorandom sequences and decision means delivering a data item, means for producing the synchronization signals able to control the interference suppression means, means for producing synchronization signals able to control the decision means of the final stage, said receiver being characterized in that the means for producing the synchronization signals are constituted by K means placed solely in the K channels of the final stage, the K synchronization signals produced by these K means controlling the K decision means of the K channels of the final stage and the interference estimation means of the K channels of the interference suppression stages, following appropriate time shifts.

Thus, preferably, the K synchronization signals also control the K correlation means.

Preferably, the K correlation means of the K channels of the final stage are constituted by K matched filters with K pseudorandom sequences and the K correlation means of the K channels of each interference suppression stage are constituted by K sliding correlators.

DESCRIPTION OF EMBODIMENTS

Figure 1:
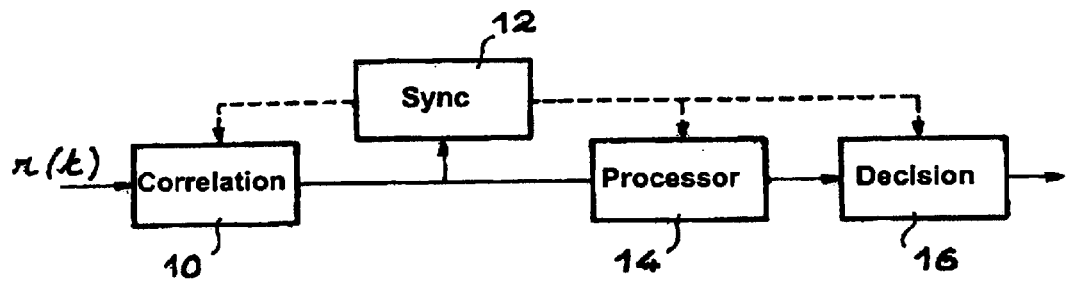
FIG. 1, already described, shows a known spread spectrum receiver.
Figure 2:
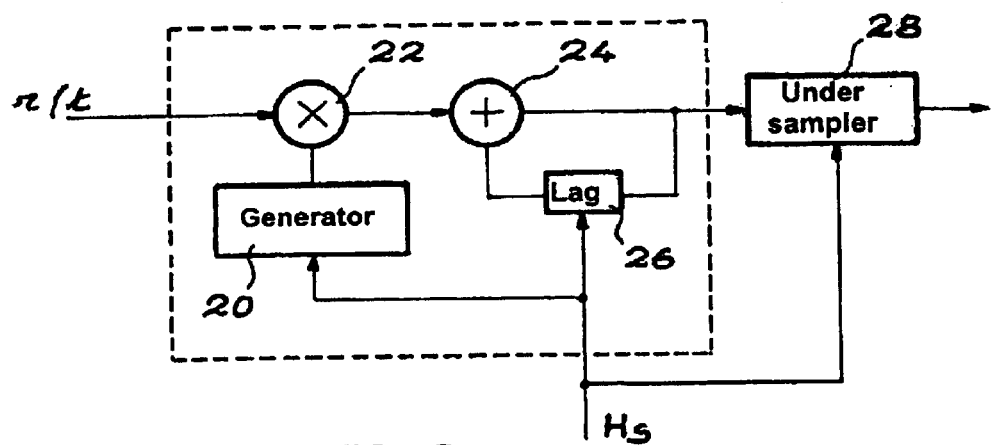
FIG. 2, already described, shows a sliding correlator.
Figure 3:
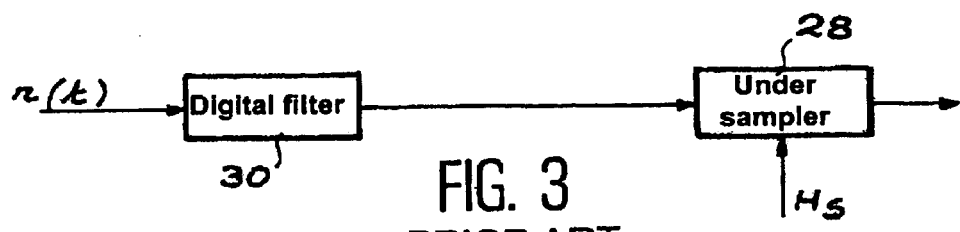
FIG. 3, already described, shows a matched filter.
Figure 4:
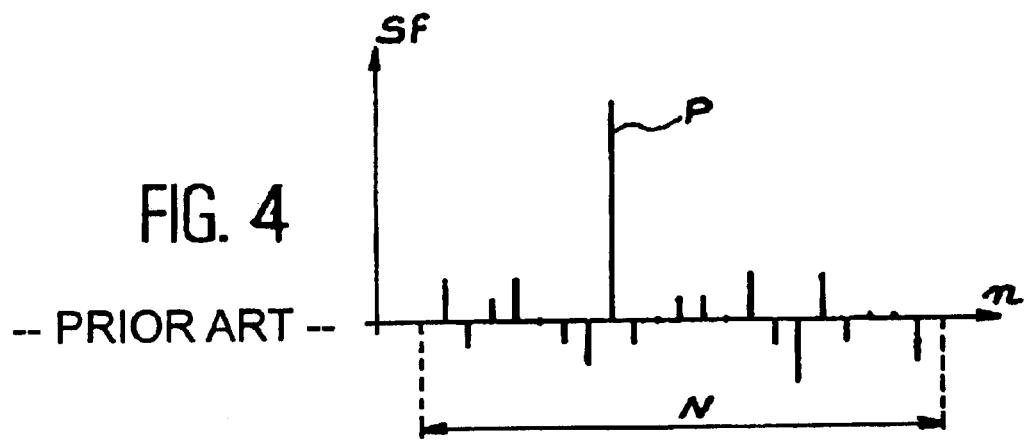
FIG. 4, already described, shows the output signal of a matched filter.
Figure 5:
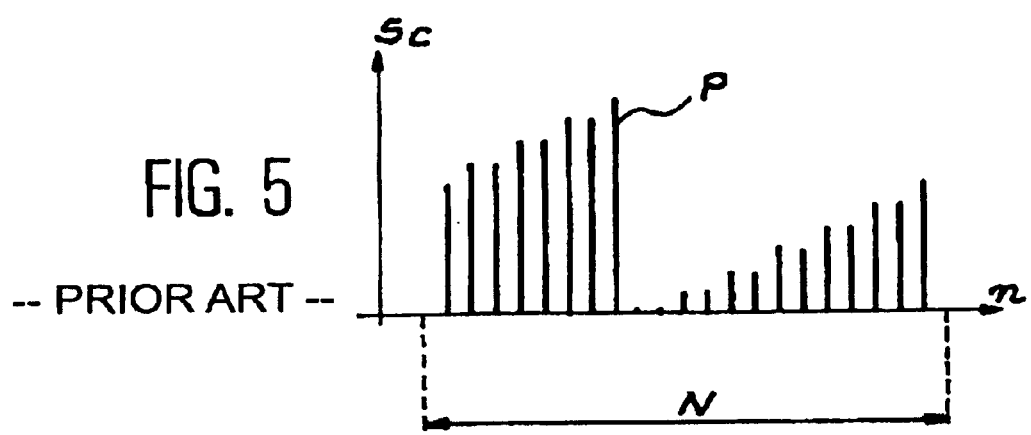
FIG. 5, already described, shows the output signal of a sliding correlator when the local replica of the sequence is aligned with the transmitted sequence.
Figure 6:
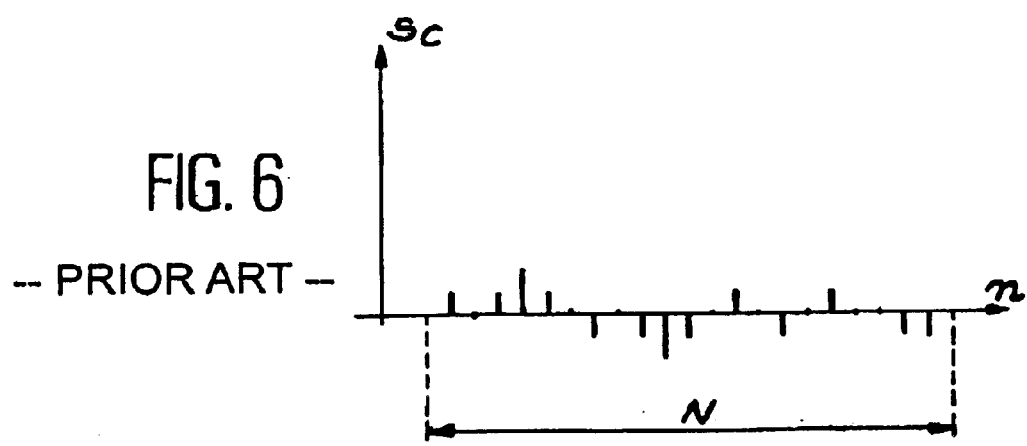
FIG. 6, already described, shows said same output signal when the local replica is not aligned with the transmitted sequence.
Figure 7:
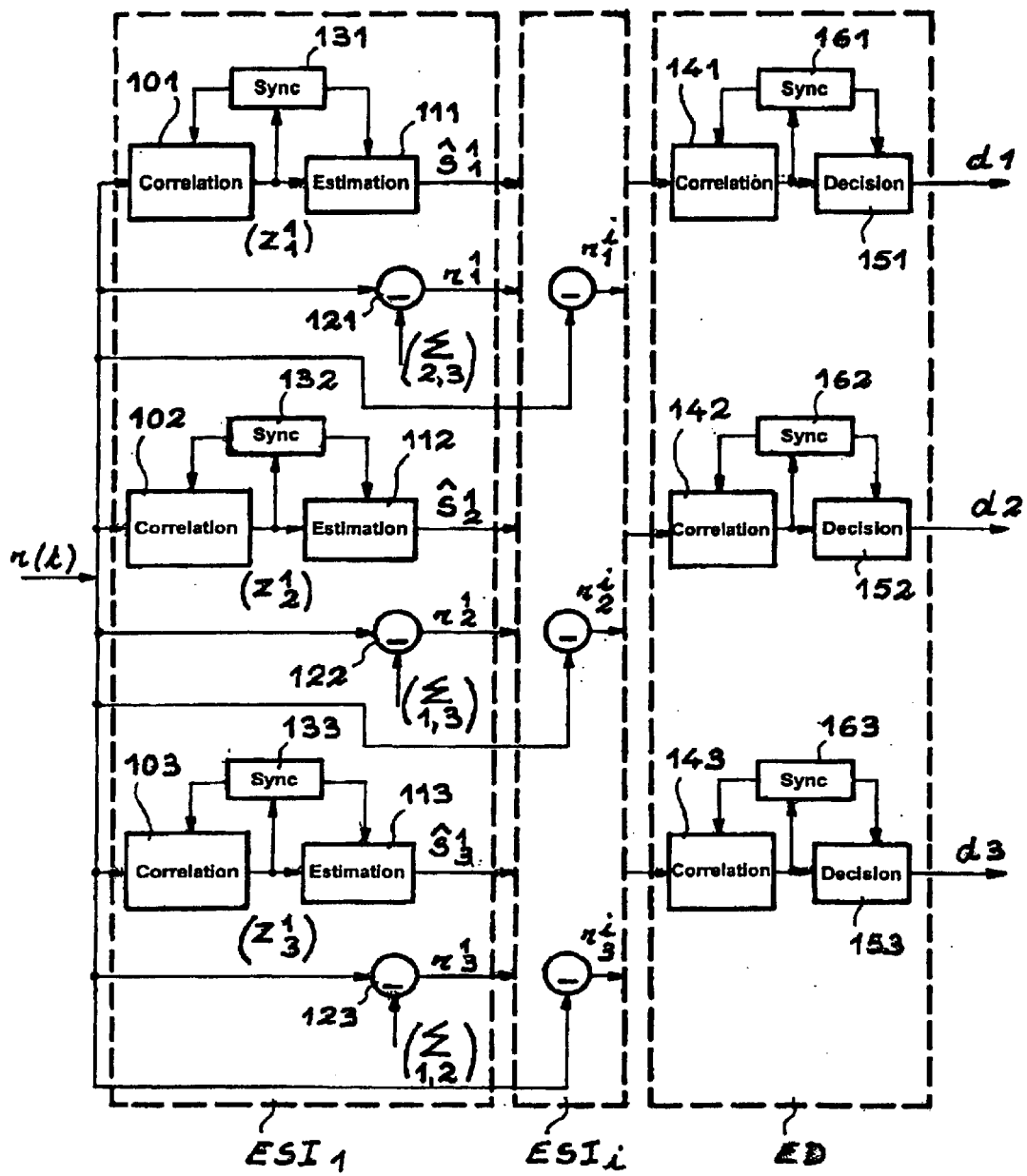
FIG. 7, already described, shows a CDMA receiver with multiple access interference suppression according to the prior art.
Figure 8:
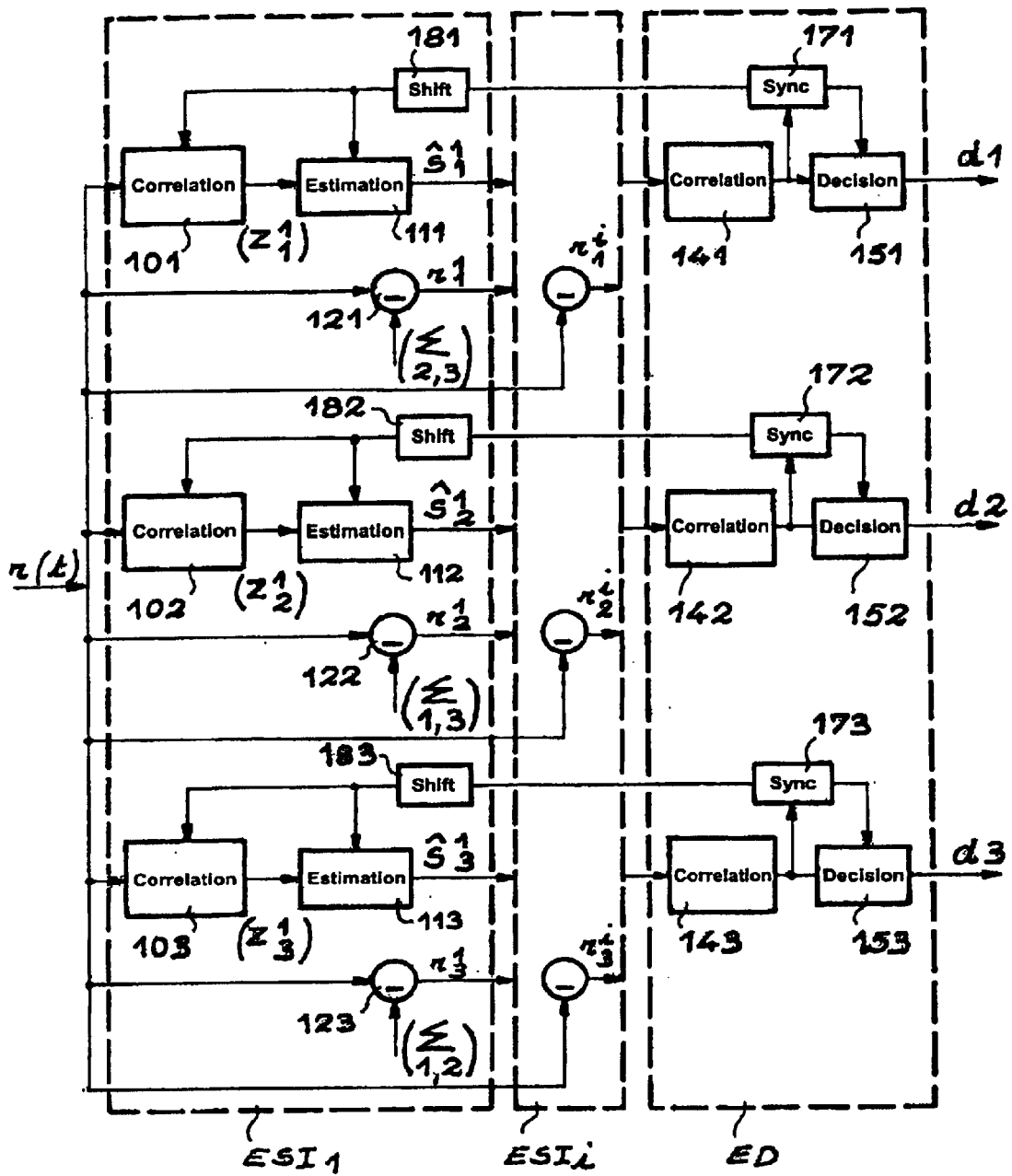
FIG. 8 shows a receiver according to the invention.

FIG. 8 illustrates an embodiment of a receiver according to the invention. FIG. 8 corresponds to FIG. 7 and the same means carry the same references. It is obvious that the invention is not limited to three channels and in fact extends to K channels, K being random. Moreover, the number i of multiple access interference suppression stages is also of a random nature.

In FIG. 8, the synchronization means are constituted by the three means 171, 172, 173 in the decision stage ED, said means being used not only in the channels of the final stage, but also in the interference suppression stages like stage $ESI_1$, where the signals delivered by the means 171, 172, 173 are applied to the correlation means 101, 102, 103 and to the estimation circuits 111, 112, 113, following an appropriate time shift supplied by the circuits 181, 182, 183 comprising, modulo the symbol period, the processing time.

The correlations means 141, 142, 143 of the final stage are advantageously matched filters making it possible to acquire the synchronization in a single symbol period, whereas the correlation means 101, 102, 103 of the interference suppression stages are sliding correlators, which reduces the complexity without any deterioration to the acquisition time.

What is claimed is:

1. A receiver for code distribution multiple access transmission and parallel multiple access interference suppression, the receiver comprising:

at least one multiple access interference suppression stage $ESI_i$ constituted by K channels, each comprising a correlation means corresponding to a particular pseudorandom sequence, an interference estimation means and an interference suppression means, each stage delivering to a following stage K signals at least partly freed from multiple access interferences, a final, decision stage (ED) constituted by K channels receiving the K signals from the K channels of a preceding suppression stage and each comprising a correlation means corresponding to one of the pseudorandom sequences and decision means delivering a data item, means for producing synchronization signals able to control the at least one multiple access interference suppression stage and control the decision means of the final stage (ED), said receiver being characterized in that the means for producing the synchronization signals are constituted by K means solely placed in the K channels of the final stage (ED), the K synchronization signals produced by said K means controlling the K decision means of the K channels of the final stage (ED) and the interference estimation means of the K channels of the at least one interference suppression stages $ESI_i$ following appropriate time shifts.

2. Receiver according to claim 1, wherein the K synchronization signals also control the K correlation means of the K channels of the at least one multiple access interference suppression stage.

3. Receiver according to claim 1, wherein the K correlation means of the K channels of the final stage (ED) are constituted by K matched filters with K pseudorandom sequences and the K correlation means of the K channels of each interference suppression stage $ESI_i$ are constituted by K sliding correlators.

* * * * *